United States Patent Office 3,324,089
Patented June 6, 1967

3,324,089
SILICON-CONTAINING COMPOUNDS AND A
PROCESS OF PRODUCING SAME
William J. Trepka, Bartlesville, Okla., assignor to Phillips
Petroleum Company, a corporation of Delaware
No Drawing. Filed Mar. 25, 1963, Ser. No. 267,842
17 Claims. (Cl. 260—79.5)

This invention relates to novel polymeric compositions and a process and catalyst for producing same. In one aspect this invention relates to a new class of silicon-containing terminally reactive polymeric materials. Another aspect of this invention relates to the use of a novel catalyst system for producing silicon-containing terminally reactive polymeric materials. A further aspect of this invention relates to a novel process for the preparation of silicon-containing terminally reactive polymers. In a still further aspect, this invention relates to novel semitelechelic polymers and a method for producing same.

It is known that useful polymeric products are obtainable by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups which in turn enable more effective cures to be obtained since all the molecules can be tied into the cross-linked structure. Also, by simple coupling arrangements alone or with auxiliary curing, liquid polymers can readily be converted into solids and soft, tacky rubber can be made quite rigid.

I have now found in accordance with this invention that a novel class of polymeric compositions can be prepared by the polymerization of a polymerizable monomeric compound in the presence of a catalyst of the formula $R'_{(n)}R''_{(3-n)}SiM$ wherein $R'$ is aryl, $R''$ is hydrogen or alkyl, $M$ is an alkali metal, and $n$ is 1, 2 or 3. The resulting compounds not only are useful for a variety of purposes themselves but also are capable of serving as intermediates in the further production of a novel class of coupled polymers and polymers having a reactive group on a terminal end thereof.

Thus it is an object of this invention to provide a novel process for the polymerization of polymerizable compounds wherein arylalkylsilyl alkali metal compounds are used as a catalyst.

Another object of this invention is to produce novel polymeric compounds having an arylsilyl group therein.

Another object of this invention is to provide novel coupled polymeric compositions having at least two arylsilyl groups therein.

A still further object of this invention is to provide novel polymers having a terminal arylsilyl group therein.

Other aspects, objects and the several advantages of this invention will be readily apparent to those skilled in the art upon reading the following description and the appended claims.

According to this invention, use of a compound $R'_nR''_{(3-n)}SiM$, wherein $R'$ is aryl or substituted aryl, $R''$ is hydrogen or alkyl, $M$ is an alkali metal, and $n$ is 1, 2 or 3, as the catalyst in the polymerization of one or more polymerizable compounds results in novel polymers of the formula $$R'_nR''_{(3-n)}Si(Monomer)_xM$$

wherein M, R', R", and n are the same as above and x equals the number of monomer molecules in the polymer.

Coupling of two such polymer molecules, one of which has $x$ monomer units and the other $y$ units, results in the formation of a polymer molecule having the formula $$R'_nR''_{(3-n)}Si\text{—[Monomer]}_{x+y}\text{—}SiR''_{(3-n)}R'_n$$

Reacting one such polymer molecule with water or an alcohol, such as illustrated hereinafter, results in the formation of a polymer molecule having the formula $$R'_nR''_{(3-n)}Si\text{—[Monomer]}_x\text{—}H$$

The monomers which can be employed in the preparation of the silicon-containing terminally reactive polymers include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, 2-methyl-1,3-butadiene, phenylbutadiene, 3,4-dimethyl-1,3-hexadiene, 4,5-diethyl-1,3-octadiene, etc. In addition, conjugated dienes containing reactive substituents along the chain also can be employed, such as for example halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyltoluene, and the like; heterocyclic nitrogen-containing monomers such as pyridine and quinoline derivatives containing at least 1 vinyl or alphamethylvinyl group, such as 2-vinylpyridine, 3-vinylpyridine, 4-vinylpyridine, 3-ethyl-5-vinylpyridine, 2-methyl-5-vinylpyridine, 3,5 - diethyl-4 - vinylpyridine, etc.; similar mono- and di-substituted alkenyl pyridines and like quinolines; acrylic acid esters such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, and the like.

The above compounds, in addition to being polymerizable alone, are also copolymerizable with each other and can be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers, in addition to including homopolymers and copolymers of the above materials, also include block copolymers, which are formed by polymerizing a monomer onto the end of a polymer, the monomer being introduced in such a manner that substantially all of the coreacting molecules enter the polymer chain at this point. In general, the block copolymers can include combinations of homopolymers and copolymers of the materials hereinbefore set forth. A detailed description of block copolymers containing terminally reactive groups and their method of preparation is set forth in the copending application of R. P. Zelinski, Ser. No. 796,277, filed Mar. 2, 1959.

The terminally reactive polymers are prepared by contacting the monomer or monomers desired to be polymerized with an organosilyl alkali metal compound. The organosilyl alkali metal compounds contain lithium as the preferred alkali metal.

The organosilyl alkali metal compounds can be prepared in several ways, for example by replacing halogen in an organic silylhalide with alkali metal or by alkali metal cleavage of an organo-disilane.

The organosilyl alkali metal compound initiates the polymerization reaction, with the organosilyl radical being attached terminally at one end of the polymer chain to give a stable group thereon and the alkali metal being attached terminally to the other end of the polymer chain. The polymers in general will be linear polymers having two ends. The general reaction can be illustrated graphically as follows:

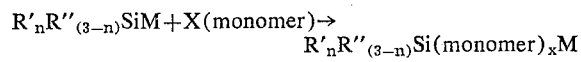

A specific example is:

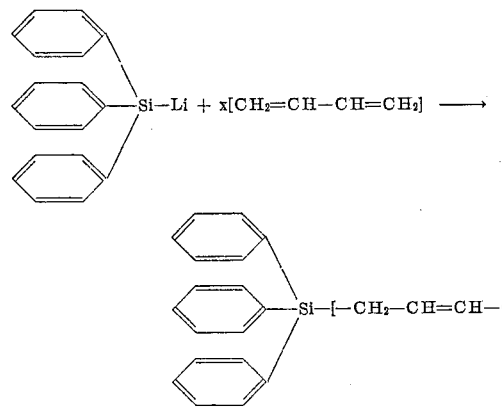

In the specific example 1,4-addition of butadiene is shown; however, it should be understood that 1,2-addition also can occur.

While organosilyl compounds of the various alkali metals can be employed in carrying out the polymerization, organosilyllithium compounds are preferred.

In the formula $R'_nR''_{(3-n)}SiM$ for the catalyst of the invention, R' is an aryl or substituted aryl group containing 6 to 20 carbon atoms per molecule and at least one but no more than three aromatic rings. Examples of these groups are those derived from benzene, naphthalene, anthracene, phenanthrene, and their alkyl-substituted derivatives. As indicated, R'' can be hydrogen or alkyl; the alkyl group(s) can have from 1 to 5 carbon atoms, e.g. methyl, ethyl, propyl, isopropyl, secondary butyl, n-pentyl, and the like. The alkali metal M can be lithium, sodium, potassium, rubidium or cesium. Examples of these catalysts with R'=phenyl, R''=hydrogen or methyl, and M=lithium are phenylsilyllithium, phenyldimethylsilyllithium, diphenylmethylsilyllithium, and triphenylsilyllithium. Other examples of related compounds that can be used as catalyst are di(1-naphthyl)silylsodium, 2-naphthylisopropylsilylpotassium, phenyl - 2 - cumenylbutylrubidium, 3 - anthryl - 2 - phenanthryl-2-tolylsilylcesium, 2 - (5,8-diisopropylphenanthryl) - diisopentylsilyllithium, and the like.

The amount of initiator which can be used will vary depending on the polymer prepared, and particularly the molecular weight desired. Usually the terminally reactive polymers are liquids or semisolids having molecular weights in the range of 1000 to about 60,000. However, depending on the monomers employed in the preparation of the polymers and the amount of initiators used, solid terminally reactive polymers can be prepared having molecular weights up to 150,000 and higher. When the terminally reactive polymers are subjected to curing or reaction with polyfunctional compounds, materials of still higher molecular weight are obtained. Usually the initiator is used in amounts between about 0.1 and about 100 millimols per 100 grams of monomer, preferably 1 to 50 millimols per 100 grams of monomer.

Formation of the terminally reactive polymers generally is carried out in the range of between —100 and +150° C., preferably between —75 and +75° C. The particular temperatures employed will depend both on the monomers and the initiators used in preparing the polymers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g. paraffins, cycloparaffins, and aromatics containing from 4 to 10 carbon atoms per molecule and/or polar compounds such as ethers, thioethers, and tertiary amines, such as diethyl ether, ethyl propyl ether, dibenzyl ether, tetrahydrofuran, dioxane, diethyl sulfide, tri-n-propylamine, N,N-dimethylaniline, pyridine and the like. As stated previously, the organosilyllithium compounds are preferred as initiators in the polymerization reaction since the polymerization can be carried out at normal room temperatures. This is not to say, however, that other organosilyl alkali metal initiators cannot be employed; however, usually more specialized operation or treatment is required with these materials. Since it is desirable to obtain a maximum yield of terminally reactive polymers, it is within the scope of the invention to use separation procedures, particularly with alkali metal initiators other than lithium compounds, to separate terminally reactive polymer from the polymer product.

The terminally reactive polymers prepared in accordance with the process of this invention contain an alkali metal atom on one end of the polymer chain and the organosilyl radical of the initiator on the other end of the polymer chain. These terminally reactive polymers can be treated with reagents to introduce various reactive groups in place of the alkali metal atoms. The following equations represent examples of specific methods which can be employed to introduce reactive groups. In these equations, P designates a polymer chain, and R designates the group $R'_nR''_{(3-n)}Si—$.

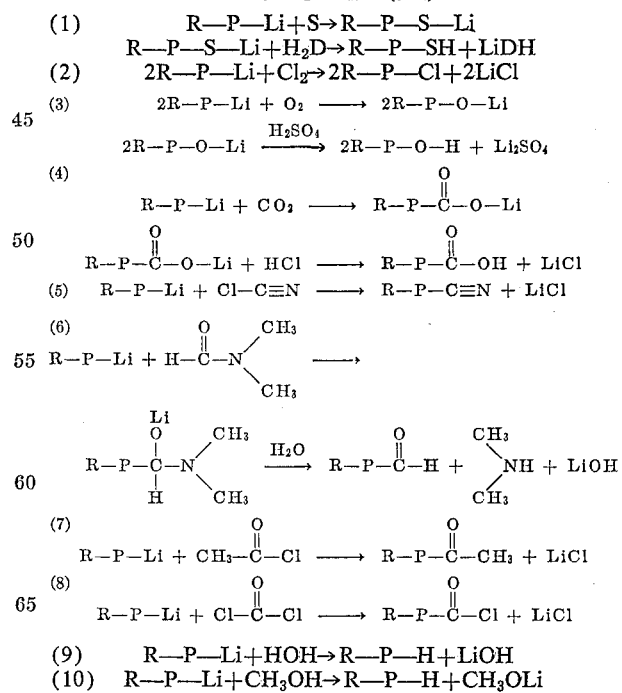

(9)      R—P—Li+HOH→R—P—H+LiOH
(10)    R—P—Li+CH₃OH→R—P—H+CH₃OLi

Some examples of reagents which can be employed to displace the terminal alkali metal atom and place the aforedescribed and other reactive groups on the ends of the polymer chain are acetone, methyl ethyl ketone, phenyl methyl ketone, benzyl ethyl ketone, p-tolyl n-propyl ketone, acetyl chloride, propionyl chloride, butyryl bromide, benzoyl chloride, α-cyclohexylacetyl chloride, ethyl acetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2-cyclohexylacetonitrile, benzonitrile, p-methylbenzonitrile, ethyl isocyanide, n-butyl isocyanide, n-decyl isocyanide, 2-(4-methylcyclohexyl)ethyl isocyanide, methyl isocyanate, propyl isocyanate, phenyl isocyanate, benzyl isocyanate, p-tolyl isocyanate, n-pentyl isothiocyanate, 2-hexyl isothiocyanate, butenyl isothiocyanate, xylyl isothiocyanate, benzoquinone, 2-methylbenzoquinone, 4-bromocyclohexanone, ketene ethylketene, phenylketene, cyclohexylketene, and the like.

Conversion of the polymers containing terminally reactive groups, as set forth above, to solid polymers also can be effected by heating in the presence of a conventional curing agent or a conventional curing system. Various curing agents can be employed for this purpose, depending on the polymers which are being treated, including peroxides such as benzoyl peroxide and dicumyl peroxide, ultraviolet and ionizing radiation, and systems employing sulfur in conjunction with other agents, including vulcanization accelerators such as tetramethylthiuram disulfide, benzothiazyl disulfide, mercaptobenzothiazole, thiocarbanilide, N-cyclohexyl-2-benzothiazyl-sulfenamide, and N,N-dimethyl-S-tert-butylsulfenyl dithiocarbamate, and including such accelerator activators as magnesium or zinc oxide in conjunction with fatty acids, zinc stearate, magnesium stearate, and the like.

The reactive groups, which when present on the end of the polymer chain provide means for curing by heat alone as described above, are in general halogen and groups which contain sulfur, oxygen or nitrogen, such as:

$$-SH, \ -\overset{S}{\underset{\|}{C}}-SH, \ -SO_3H, \ -SCl, \ -C_6H_4NO_2, \ -C_6H_3(OH)_2,$$

$$-\overset{O}{\underset{\|}{C}}-OR''', \ -OH, \ -COCl, \ -COR''', \ -C\equiv N$$

and the like, wherein R''' is selected from the group consisting of hydrogen and aliphatic, cycloaliphatic, and aromatic radicals. These groups, which can be defined as "self-curing," can be placed on the end of the polymer chain by reaction with suitable reactants as indicated earlier. The organosilyl group present at the other end of the polymer molecule imparts thermal stability to the polymer. Other reactants which can be employed in a like manner to replace the alkali metal atom with reactive groups are carbon disulfide, sulfur dioxide, disodiumchlororesorcinate, and the like.

The polymers containing the terminally reactive sulfur, oxygen and nitrogen-containing groups set forth above are converted to solid polymers by heating at temperatures in the range of between about 100 and about 500° F. and preferably between about 200 and about 350° F. More usually, the heating is continued for a period of between about 2 minutes and about 24 hours, the particular time employed depending upon the polymers being treated and the reactive groups which are terminally attached to the polymers. The reactions which take place in the formation of the solid polymers are typified by the following specific example, wherein R has the same meaning as before:

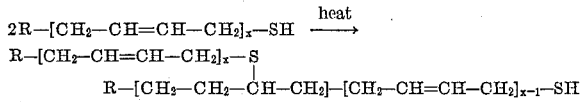

As will be shown hereinafter, coupling agents can be used to tie polymer chains together by effecting reaction between the coupling agent and the terminally reactive group. In some cases, compounds listed above as reagents for substituting other terminally reactive groups for the alkali metal atoms also can serve as coupling agents. For example, $COCl_2$ can act as a coupling agent as shown in the following equation:

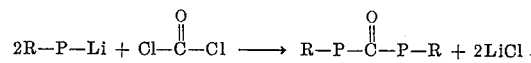

If it is desired to utilize this reagent in the manner shown earlier (equation 8), it is necessary to use an amount in excess of the stoichiometric. If coupling is desired, smaller amounts of the reagent are employed.

Some of the reagents which can be utilized to replace the terminal alkali metal atom with other reactive groups serve to place reactive groups on the polymer chain ends which contain more than one functional group. As shown above, the use of dimethylformamide to provide a terminal aldehyde group proceeds through a hydrolysis step. This hydrolysis step also can serve to remove only the lithium (or other alkali metal) atom and thus provide a terminal group containing both a hydroxyl and a tertiary amine group.

The reagents shown above serve to replace terminal alkali metal atoms with other desired reactive groups. In most of the reactions, hydrolysis or a similar step supplying H+ ions is required to finally displace the alkali metal. The present invention is not to be construed as being so limited, since the reactive groups resulting from such reactions can be further converted to other desired functions by one, two or more steps. Such known reactions as oxidation, reduction, esterification and the like can be employed in such a manner of operation.

In accordance with another aspect of this invention, the polymers containing either a terminal alkali metal atom such as lithium atom or the polymers containing other terminally reactive groups as hereinbefore described are coupled by means of organic polyfunctional coupling agents. The preferred polymers of this invention are prepared by means of organosilyl alkali metal organo compounds, the resulting polymers containing one terminally reactive group; therefore, the preferred polyfunctional coupling agents are those containing two functional groups. In general, polyfunctional alcohols, ethers, acids, halides, amines, ketones, isocyanates, epoxy compounds, and the like are employed. The organic radicals of the organic polyfunctional compounds are preferably selected broadly from aliphatic, cycloaliphatic and aromatic hydrocarbon radicals. The reaction with polyfunctional compounds can be illustrated by the following specific example, wherein P and R have the same meaning as before:

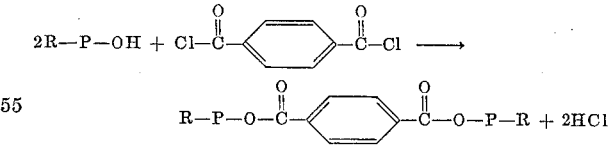

Examples of specific coupling agents which can be employed are: ethylene glycol, propylene glycol, decylene glycol, dihydroxybenzene, dihydroxycylohexane, 1,4-di(hydroxyethyl)benzene, glycerol, 1,2,3-trihydroxybutane, erythritol, mannitol, aminophenol, pyrocatechol, resorcinol, pyrogallol, oxalic acid, malonic acid succinic acid, adipic acid, sebacic, acid, phthalic acid (o, m and p), cyclohexane dicarboxylic acid, pyridine dicarboxylic acid, naphthalic acid, fumaric acid, the anhydrides of the above listed acids, methylene chloride, 1,2-dibromoethane,
1,4-dichlorobutane, dibromobenzene, 4-bromobenzyl bromide,
dichlorocyclohexane, 1,4-dichloronaphthalene,
ethylenediamine, pentamethylenediamine,
1,8-diamino-3-octene, 1,4-diaminobenzene,
1,3-diaminocyclohexane, 4-aminobenzylamine,
1,4-diaminonaphthalene, 4-(aminoethyl)-aniline, hydroquinone, 1,4-bis(acetyl)butane, 1,5-bis(propionyl)
pentane,
1,4-bis(acetyl)cyclohexane, alpha,alpha'-bis(acetyl)
xylene,
butane-1,4-diisocyanate, octane-1,8-diisocyanate,
cyclohexane-1,4-diisocyanate, benzene-1,4-diisocyanate,
butane-1,4-disulfonic acid, hexane-1,6-disulfonic acid,
decane-1,10-disulfonic acid, cyclohexane-1,4-disulfonic
acid,
benzene-1,4-disulfonic acid, 1,4-di(sulfoethyl)benzene,
2-(3-sulfophenyl)propane sulfonic acid,
2,4-tolulene diisocyanate, bis(chloromethyl)ether,
bis(1-bromoethyl)ether, methyl dichloromethyl ether,
bis(1-fluoropropyl)ether, bis(iodomethyl)ether,
chloromethyl-1-chloropropyl ether, bis(1-iodamyl)ether,
bis(1-chloro-decyl)ether, hexyl-1,1-dichloroheptyl ether,
bis(1,1-dibromodecyl)ether, 1-chloro-n-butyl-1,1-
dichloro-n-butyl ether,
1,1-difluoroethyl-1-fluoroheptyl ether, bis[chloro(ethoxy)
methyl]ether,
bis[1-bromo(2-propyl)ethyl]ether,
difluoromethyl-1-fluoro(3-ethoxy)propyl ether,
bis[chloro(vinyloxy)methyl]ether,
bis[1-iodo-(4-vinyloxy)n-butyl]ether,
1-bromo(2-vinyloxy)ethyl-1,1-dibromopropyl ether,
bis[1-chloro(5-vinyloxy)octyl]ether,
bis[chloro(N,N-dimethylamino)methyl]ether,
dibromomethyl-1-bromo-4-(N,N-dimethylamino)-n-
butyl ether,
bis[1-iodo-6-(N,N-diethylamino)hexyl]ether, and the like.

In addition to the foregoing it is within the scope of the invention to react a terminally reactive polymer with a terminally reactive polymer made from the same or different monomers but having different reactive groups, such as typified by the following specific reaction, wherein P and R have the same meaning as before:

Reaction of the terminally reactive polymer with the polyfunctional compounds can be carried out over a range of temperatures generally between about −100 and about +350° F., and more usually between about 0 and about 250° F. The time employed in carrying out the reaction will vary depending on the particular materials being reacted, and is generally less than 20 hours. The quantity of functional reactant employed in carrying out the reaction is usually between about 0.5/1 to 5/1 equivalents based on the original initiator charge. The reaction mechanism is somewhat similar to that previously described in that the functional or reactive group of the reactant can react with the reactive group at the end of the chain of the terminally reactive polymer and with double bonds of either the same molecule or other molecules of the polymer. The products which result from the reaction of the polyfunctional compound and the terminally reactive polymer can be subjected to a further treatment in the presence of conventional curing agents or curing systems. The curing agents and systems which can be employed, in general, are those which were set forth in the preceding discussion.

It is, of course, within the scope of the invention in the preparation of any of the solid polymers thereof to employ conventional compounding agents such as curatives, fillers, pigments, reinforcing agents, plasticizers, extenders, antioxidants, and the like.

The terminally reactive polymers of this invention are characterized by the wide range of molecular weight which can be obtained and also by the inert $R'_nR''_{(3-n)}Si$ group present therein. As previously pointed out, these polymers can be prepared with molecular weights ranging from 1000 to as high as 150,000 or higher. The polymers, which usually are liquids or semi-solids but which can also be solids, find various uses, a major use being in the preparation of the solid polymers of this invention, i.e., by the reaction of the polymers with polyfunctional compounds, heating, curing, etc. The polymers also find use as binders, for example in the preparation of castable solid materials. The solid polymers of this invention vary widely in their properties, depending on the particular monomers and mixtures of monomers utilized in their preparation. Many of the polymers are tough, rubbery materials, others are plastic in nature, and others are highly elastic. Due to their excellent stability properties, they find wide application in the preparation of molded articles such as tires, hoses, mechanical goods and other rubber articles; and they can also be extruded, calendered, and otherwise treated as conventional plastics.

Particular advantages are realized in the preparation of the solid polymers. Since the polymers usually are liquid or semi-solid up to the final treatment they can be readily handled, easily combined with additives such as fillers, curing agents, etc., and can be readily molded, without the use of high pressures, in all types and sizes and in both regular and irregular shapes.

The following examples are presented in illustration of the invention.

METHODS

An organosilyl alkali metal initiator was prepared by lithium cleavage of hexaphenyldisilane according to the procedure of Gilman et al. (J. Am. Chem. Soc., 80, 608–11 (1958)). The reaction was carried out in tetrahydrofuran solvent and the finished catalyst was used either in this solvent or in toluene added after removal of most of the tetrahydrofuran by contacting with hot mineral oil.

Inherent viscosity was determined as follows: one-tenth gram of polymer was placed in a wire cage made from 80 mesh screen and the cage placed in 100 ml. of toluene contained in a wide-mouth 4-ounce bottle. After standing at room temperature (approximately 25° C.) for 24 hours, the cage was removed and the solution filtered through a C porosity sulfur absorption tube to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample. In instances where the polymer was of low molecular weight (inherent viscosity below 0.5), a 0.3 gram sample was used for the determination instead of 0.1 gram.

The molecular weights given in Table I were calculated according to the general method of Scott et al., J. Am. Chem. Soc. 71, 220–223 (1949), using the formula $$[\eta] = KM^a$$

wherein M is molecular weight, $[\eta]$ is the inherent rather than the intrinsic viscosity, and K and a are constants.

The percentage of polymer formed by cis-1,4-addition, trans-1,4-addition, and 1,2(vinyl)-addition was determined by dissolving the polymer in carbon disulfide to form a solution having 25 grams of polymer per liter of solution, and then determining the infrared spectrum (percent transmission) of the solution.

The percentage of total unsaturation present in trans-1,4 was calculated according to the following equation and consistent units: $\epsilon = E/tc$ when $\epsilon$=extinction coefficient (liters-mols$^{-1}$-centimeters$^{-1}$); $E$=extinction (log I/I); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percentage of total unsaturation present as 1,2- (or vinyl) was calculated according to the above equation using the 11.0 micron band and an extinction coefficient of 209 (liters-mols$^{-1}$-centimeters$^{-1}$).

The percentage of total unsaturation present as cis-1,4 was obtained by subtracting the trans-1,4 and 1,2- (vinyl) determined according to the above procedure from the theoretical unsaturation.

The following polymerization runs were made by charging the reactor bottles with solvent, flushing with nitrogen, and capping the bottles with a rubber cap and a punched-crown cap. The monomer and catalyst were charged in that order with syringes, and the bottles were pressured to 25 p.s.i.g. with nitrogen. The bottles were then placed in a constant temperature bath for polymerization. At the end of the polymerization period the reaction was short-stopped and the product coagulated with isopropanol containing 1 percent AO-2246, which is a commercial antioxidant identified as 2,2'-methylene-bis-(4-methyl-6-tert-butylphenol); enough of this mixture was added to furnish 1 part by weight of AO-2246 per 100 parts of monomer and to replace the lithium atom with a hydrogen atom.

Example I

Runs were made in which 100 parts of isoprene was polymerized in 1000 parts of n-pentane solvent with triphenylsilyllithium dissolved in either tetrahydrofuran (THF) or toluene for 24 hours at 50° C.:

| Run No. | Catalyst | | Induction Period, min. | Conv., percent | Inherent Viscosity |
|---|---|---|---|---|---|
| | Solvent | Conc., mhm.[d] | | | |
| 1 | THF | 2 | 0–15 | 100 | |
| 2 | THF | 3 | 0–60 | 84.8 | 1.52 |
| 3 | THF | 5 | 0–60 | 100 | [a] 0.51 |
| 4 | THF | 10 | 0–60 | 100 | |
| 5 | THF | 20 | 0 | 98.0 | 0.14 |
| 6 | Toluene | 2 | 0–30 | 18.4 | |
| 7 | do | 4 | 0–30 | 98.4 | 0.99 |
| 8 | do | 6 | 0–30 | 94.6 | 0.58 |
| 9 | do | 10 | 0–60 | 98.2 | 1.39 |
| 10 | do | 12 | 0–30 | 97.2 | [b] 0.32 |
| 11 | do | 14 | 0–30 | 97.0 | 0.26 |
| 12 | do | 20 | 0–60 | 100 | 0.54 |
| 13 | do | 30 | 0–60 | 98.2 | [c] 0.33 |

[a] The microstructure of this polymer was determined by infrared absorption; it contained 20±5 percent cis-, 15±5 percent trans- and 55±5 percent 3,4- polymer.
[b] The molecular weight of this polymer was found to be 16,500 by ebulliometric measurement. A reasonable approximation of 16,600 was made from inherent viscosity. This close agreement in indicative of a narrow molecular weight distribution and suggests rapid initiation.
[c] Both infrared and emission spectra analyses indicated the presence of silicon in this polymer.
[d] Millimoles per 100 parts monomer.

Example II

Runs were made in which 100 parts of butadiene was polymerized in 866 parts of toluene solvent with triphenylsilyllithium dissolved in either THF or toluene for 24 hours at 50° C.:

| Run No. | Catalyst | | Induction Period, min. | Conv., percent | Inherent Viscosity | Microstructure, percent | | |
|---|---|---|---|---|---|---|---|---|
| | Solvent | Conc., mhm. | | | | Trans- | Vinyl | Cis- |
| 1 | THF | 1 | | 0 | | | | |
| 2 | THF | 2 | 0–10 | 89.0 | 1.18 | 24.4 | 53.8 | 21.8 |
| 3 | THF | 3 | 0–10 | 90.4 | 1.03 | 22.1 | 56.3 | 21.6 |
| 4 | THF | 4 | 0–10 | 100 | 1.06 | 21.7 | 58.6 | 19.7 |
| 5 | THF | 5 | 0–10 | 78.8 | 0.71 | 18.7 | 59.9 | 21.4 |
| 6 | Toluene | 6 | | 0 | | | | |
| 7 | do | 8 | 0–30 | 93.6 | 0.81 | 38.6 | 33.5 | 27.9 |
| 8 | do | 10 | 0–30 | 100 | 0.75 | 39.7 | 33.8 | 26.5 |
| 9 | do | 12 | 0–30 | 98.4 | 0.59 | 37.6 | 35.7 | 26.7 |
| 10 | do | 14 | 0–30 | 92.6 | 0.47 | 37.0 | 37.8 | 25.2 |

Example III

Runs were made in which 100 parts of styrene was polymerized in 866 parts of toluene solvent with triphenylsilyllithium dissolved in either THF or toluene for 24 hours at 50° C.:

| Run No. | Catalyst | | Induction Period, min. | Conv., Percent | Inherent Viscosity |
|---|---|---|---|---|---|
| | Solvent | Conc., mhm. | | | |
| 1 | THF | 1 | 0–10 | 100 | 0.60 |
| 2 | THF | 2 | 0–10 | 100 | |
| 3 | THF | 3 | 0–10 | 100 | 0.41 |
| 4 | THF | 4 | 0–10 | 100 | |
| 5 | THF | 5 | 0–10 | 100 | [a] 0.20 |
| 6 | Toluene | 4 | 0–5 | 83.8 | 0.47 |
| 7 | do | 5 | 0–5 | 100 | 0.38 |
| 8 | do | 6 | 0–5 | 98.4 | 0.34 |
| 9 | do | 8 | 0–5 | 86.6 | 0.24 |

[a] Infrared analysis indicated the presence of silicon in this polymer.

Example IV

Runs were made in which 75 parts of butadiene and 25 parts of styrene were polymerized in 780 parts of cyclohexane solvent with triphenylsilyllithium dissolved in toluene for 24 hours at 50° C.:

| Run No. | Catalyst Conc., mhm. | Induction Period, min. | Conv., Percent | Inherent Viscosity | Polystyrene [a] | Refractive Index, 25° C.[b] |
|---|---|---|---|---|---|---|
| 1 | 6 | 0–5 | 95.6 | 0.74 | 1.5 | 1.5370 |
| 2 | 8 | 0–5 | 94.2 | 0.57 | 0 | 1.5360 |
| 3 | 10 | 0–5 | 93.8 | 0.48 | 0 | 1.5360 |

[a] Oxidative degradation analysis.
[b] For comparison, the refractive indices of polybutadiene from Runs 7 to 10, Example II, varied between 1.5141 and 1.5147.

The polymer formed possessed a random structure as shown by the substantial absence of any polystyrene blocks.

Example V

Runs were made in which 100 parts of methyl methacrylate was polymerized in 866 parts of toluene solvent with triphenylsilyllithium dissolved in THF for 24 hours at 5° C.:

| Run No. | Catalyst Conc., mhm. | Induction Period, min. | Conv., percent | Inherent Viscosity | Gel, percent |
|---|---|---|---|---|---|
| 1 | 1.5 | 0 | 14.2 | 0.83 | 0 |
| 2 | 3.0 | 0 | 22.6 | 0.76 | 0 |
| 3 | 5.0 | 0 | 43.0 | 0.80 | 3 |

Example VI

Runs were made in which 100 parts of acrylonitrile was polymerized in 866 parts of toluene solvent with triphenylsilyllithium dissolved in THF for 24 hours at −65° C.:

| Run No. | Catalyst Conc., mhm. | Induction Period, min. | Conv., percent | Inherent Viscosity | Gel, percent |
|---|---|---|---|---|---|
| 1 | 3 | 0 | 7.4 | 0.48 | 1 |
| 2 | 5 | 0 | 12.6 | 0.59 | 2 |
| 3 | 10 | 0 | 34.7 | 0.62 | a 0 | a Infrared analysis indicated the presence of silicon in this polymer.

*Example VII*

Runs were made in which 100 parts of isoprene was polymerized in 1000 parts of n-pentane solvent and was then coupled, using 16.3 mhm. of bis(chloromethyl)ether as coupling agent. Thirty mhm. of triphenylsilyllithium dissolved in toluene was used, and total reaction time was 30 hours at 50° C. In the first run no coupling agent was added. In the second run the coupling agent was added at the end of 6 hours, and the reaction was allowed to proceed for an additional 24 hours:

| Run No. | Induction Period, min. | Conv., percent | Inherent Viscosity |
|---|---|---|---|
| 1 a | 0–15 | 100 | 0.45 |
| 2 | 0–15 | 98.6 | 0.68 | a Control; no coupling agent was added.

An approximate doubling of molecular weight as shown below indicates that coupling occurred.

Molecular weights calculated by the Scott et al. equation for several of the polymers of the examples together with structures based on those molecular weights are:

TABLE I.—CALCULATED POLYMER MOLECULAR WEIGHTS AND STRUCTURES

| Example No. | Run No. | Molecular Weight | Structure |
|---|---|---|---|
| I | 3 | 32,400 | $Ph_3Si[Isoprene]_{450-500}$—H |
| II | 4 | 85,000 | $Ph_3Si[Butadiene]_{1500-1600}$—H |
| II | 8 | 55,000 | $Ph_3Si[Butadiene]_{975-1050}$—H |
| III | 5 | 30,900 | $Ph_3Si[Styrene]_{275-325}$—H |
| III | 9 | 77,600 | $Ph_3Si[Styrene]_{750-800}$—H |
| IV | 3 | 27,600 | $Ph_3Si[Butadiene]_{360-400}[Styrene]_{60-70}$—H (random) |
| VII | 1 | 26,700 | $Ph_3Si[Isoprene]_{300-375}$—H |
| VII | 2 | 49,600 | $Ph_3Si[Isoprene]_x$—$CH_2$—O—$CH_2$—$[Isoprene]_y$—$SiPh_3$ x+y=700–750 |

Having thus described the invention by providing specific examples thereof, it is to be understood that no undue limitations or restrictions are to be drawn by reason thereof and that many variations and modifications are within the scope of the invention.

I claim:

1. A polymer composition of the formula $$R'_n R''_{(3-n)} Si—P—M$$

wherein R′ is selected from the group consisting of aryl and substituted aryl containing 6 to 20 carbon atoms and at least one aromatic ring, R″ is selected from the group consisting of hydrogen and alkyl containing 1 to 5 carbon atoms, P is a polymer of a monomer system containing at least one polymerizable vinylidene compound, M is an alkali metal, and n is an integer of from 1 to 3.

2. The polymer composition of claim 1 wherein P is a polymer of isoprene.

3. The polymer composition of claim 1 wherein P is a polymer of butadiene.

4. The polymer composition of claim 1 wherein P is a polymer of styrene.

5. The polymer composition of claim 1 wherein P is a copolymer of butadiene and styrene.

6. The polymer composition of claim 1 wherein P is a polymer of methyl methacrylate.

7. A terminally reactive silicon-containing polymeric composition of the formula $$R'_n R''_{(3-n)} SiPY$$

wherein R′ is selected from the group consisting of aryl and substituted aryl containing 6 to 20 carbon atoms and at least one aromatic ring, R″ is selected from the group consisting of hydrogen and alkyl containing 1 to 5 carbon atoms, P is a polymer of a monomer system containing at least one polymerizable vinylidene compound, n is an integer of from 1 to 3, and Y is a reactive group selected from the group consisting of —SH, —CSSH, —SO₃H, —SCl, —C₆H₄NO₂, —C₆H₃(OH)₂, —OH, —C≡N, —COCl, —COR‴, —COOR‴, and halogen, wherein R‴ is selected from the group consisting of hydrogen and aliphatic, cycloaliphatic and aromatic radicals.

8. A terminally reactive silicon-containing polymeric composition of the formula $R'_n R''_{(3-n)} SiPY$ wherein R′ is selected from the group consisting of aryl and substituted aryl, R″ is selected from the group consisting of hydrogen and alkyl, n is an integer of from 1 to 3, P is a polymer of a monomer system containing at least one polymerizable vinylidene compound and having a molecular weight of at least 1000, and Y is a functional group selected from the group consisting of —SH, —CSSH, —SO₃H, —SCl, —C₆H₄NO₂, —C₆H₃(OH)₂, —OH, —C≡N, —COCl, —COR‴, —COOR‴ and halogen, wherein R‴ is selected from the group consisting of hydrogen and aliphatic, cycloaliphatic and aromatic radicals.

9. An arylsilyl polymeric composition of the formula $$R'_n R''_{(3-n)} SiPH$$

wherein R′ is aryl, R″ is selected from the group consisting of hydrogen and alkyl, P is a polymer of a monomer system containing at least one polymerizable vinylidene compound, and n is an integer of from 1 to 3.

10. A composition according to claim 9 wherein P is isoprene.

11. A composition according to claim 9 wherein P is butadiene.

12. A composition according to claim 9 wherein P is styrene.

13. A composition according to claim 9 wherein P is a copolymer of butadiene and styrene.

14. A process for making an arylsilyl-terminated terminally reactive polymer which comprises contacting a monomer system comprising at least one polymerizable vinylidene compound with from about 0.25 to 100 millimols per 100 grams of monomer of an organosilyl alkali metal polymerization initiator having the formula $$R'_n R''_{(3-n)} SiM$$

wherein R′ is selected from the group consisting of aryl and substituted aryl, R″ is selected from the group consisting of hydrogen and alkyl, M is an alkali metal, and n is an integer of from 1 to 3 under polymerization conditions to form a polymer containing a terminal $R'_n R''_{(3-n)} Si—$ group and a terminal alkali metal atom, said polymer having a molecular weight in the range of 1000 to 150,000, and replacing said alkali metal atom with reactive groups selected from the group consisting of —SH, —CSSH, —SO$_3$H, —SCl, —C$_6$H$_4$NO$_2$, —C$_6$H$_3$(OH)$_2$, —OH, —C≡N, —COCl, —COR''' and —COOR''' wherein R''' is selected from the group consisting of hydrogen and aliphatic, cycloaliphatic and aromatic radicals.

15. A process for making an arylsilyl-terminated, terminally reactive polymer which comprises contacting a monomer system comprising at least one polymerizable vinylidene compound with from about 0.25 to 100 millimols per 100 grams of a monomer of an arylsilyl-lithium polymerization initiator of the formula R'$_n$R''$_{(3-n)}$SiLi wherein R' is selected from the group consisting of aryl and substituted aryl, R'' is selected from the group consisting of hydrogen and alkyl, and $n$ is an integer of from 1 to 3 under polymerization conditions including a temperature in the range of −11° to 150° C. and in the presence of predominantly hydrocarbon diluent to form a polymer containing terminal lithium atoms and having a molecular weight of at least 1000, and treating said lithium-containing polymer with material selected from the group consisting of (a) a reagent reactive with said terminal lithium atom to remove same and introduce functional groups subsequently defined, and (b) in sequence, first a reagent reactive with said terminal lithium atoms to introduce radicals hydrolyzable to said functional groups, and then a hydrolysis agent, said functional groups being selected from the group consisting of —SH, —CSSH, —SO$_3$H, —SCl, —C$_6$H$_4$NO$_2$, —C$_6$H$_3$(OH)$_2$, —OH, —C≡N, —COCl, —COR''', —COOR''' and halogen, wherein R''' is selected from the group consisting of hydrogen and aliphatic, cycloaliphatic and aromatic radicals, said contacting of monomer and said treating with reagent being carried out in the substantial absence of hydrolysis agent supply hydrogen ions.

16. A process for making a polymeric material which comprises contacting a monomer system comprising at least one polymerizable vinylidene compound with an organosilyl alkali metal polymerization initiator of the formula R'$_n$R''$_{(3-n)}$SiM wherein R' is aryl, R'' is selected from the group consisting of hydrogen and alkyl, M is an alkali metal, and $n$ is an integer of from 1 to 3, under polymerization conditons to form a polymer containing a terminal alkali metal atom, replacing said alkali metal atom with reactive group Y selected from the group consisting of —SH, —CSSH, SO$_3$H, —SCl, —C$_6$H$_4$NO$_2$, —C$_6$H$_3$(OH)$_2$, —OH, —C≡N, —COCl, —COR''', —COOR''', and halogen wherein R''' is selected from the group consisting of hydrogen and aliphatic, cycloaliphatic and aromatic radicals, to form a terminally reactive polymer, and reacting said terminally reactive polymer with a material selected from the group consisting of (a) a polyfunctional organic compound selected from the group consisting of alcohols, acids, acid anhydrides, halides, amines, ketones, isocyanates, and epoxy compounds, and (b) a terminally reactive polymer containing end group Y capable of reacting with said reactive group Y.

17. A process for making a polymeric material which comprises contacting a monomer system comprising at least one polymerizable vinylidene compound with an organosilyl alkali metal polymerization initiator having the formula R'$_n$R''$_{(3-n)}$SiM wherein R' is aryl, R'' is selected from the group consisting of hydrogen and alkyl, M is an alkali metal and $n$ is an integer of from 1 to 3, under polymerization conditions and in the presence of predominantly hydrocarbon diluent to form a polymer containing an organosilyl terminal group and a terminal alkali metal atom, treating said organosilyl alkali metal-containing polymer with material selected from the group consisting of (a) a reagent reactive with said terminal alkali metal atom to remove same and introduce a functional group subsequently defined, and (b), in sequence, first a reagent reactive with said terminal alkali metal atom to introduce a radical hydrolyzable to said functional group and then a hydrolysis agent, said functional group being selected from the group consisting of —SH, —CSSH, —SO$_3$H, —SCl, —C$_6$H$_4$NO$_2$, —C$_6$H$_3$(OH)$_2$, —OH, —C≡N, —COCl, —COR''', —COOR''' and halogen wherein R''' is selected from the group consisting of hydrogen and aliphatic, cycloaliphatic and aromatic radicals, said contacting of monomer and said treating with reagent being carried out in the substantial absence of hydrolysis agent supplying hydrogen ions, and thereafter reacting the resulting terminally reactive polymer containing a functional group with a polyfunctional organic compound having the formula R''''Y$_x$ wherein R'''' is selected from the group consisting of aliphatic, cycloaliphatic and aromatic radicals, $x$ is at least 2, and Y is a functional radical reactive with the functional group in said terminally reactive polymer, and characterizing said polyfunctional organic compound as a compound selected from the group consisting of alcohols, acids, acid anhydrides, halides, amines, ketones, isocyanates, and epoxy compounds.

References Cited
UNITED STATES PATENTS

| | | | |
|---|---|---|---|
| 3,004,956 | 10/1961 | Cox | 260—82.1 |
| 3,135,716 | 6/1964 | Uraneck et al. | 260—94.2 |
| 3,175,997 | 3/1965 | Hsieh | 260—94.2 |
| 3,187,032 | 6/1965 | Weyenberg | 260—93.5 |
| 3,244,664 | 4/1966 | Zelinski et al. | 260—94.7 |

FOREIGN PATENTS 218,149  8/1958  Australia.

OTHER REFERENCES

Gilman et al., Chem. and Ind., Nov. 8, 1958, pp. 1479–1480.

Bawn, Rubber and Plastics Age, March 1961, pp. 267–273.

JOSEPH L. SCHOFER, *Primary Examiner.*

W. HOOVER, E. J. SMITH, *Assistant Examiners.*